United States Patent Office 2,712,541
Patented July 5, 1955

2,712,541

ADENOSINE-6-PHOSPHORIC ACID AND SALTS THEREOF

Simon L. Ruskin, New York, N. Y.

No Drawing. Application July 10, 1952,
Serial No. 298,193

5 Claims. (Cl. 260—211.5)

This invention relates to new nucleotide compounds, and more particularly to mono adenosido-6-phosphoric acid and salts and derivatives thereof.

The new adenosido-6-phosphoric acid is an amide produced from adenosine ladenine riboside and phosphoric acid by reaction of the phosphoric acid with the $6NH_2$ group of the adenine nucleus of the adenosine, with elimination of water and direct combination of the phosphorus of the phosphoric acid with the nitrogen.

The location of the $6NH_2$ group of the adenosine is indicated by the following formula of adenosine, or adenine riboside, with the positions of the adenine group numbered and with the ribose group indicated conventionally by —$C_5H_9O_4$:

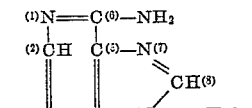

Adenosine (adenine riboside)

Phosphoric acid derivatives of adenosine are known, particularly adenylic acid which is a phosphoric acid ester of adenosine. In adenylic acid, the phosphoric acid is combined with the ribose portion of the adenosine through an ester linkage, and the $6NH_2$ group of the adenine portion of the adenosine is a free amino group.

In the new adenosido-6-phosphoric acid, the phosphoric acid is combined with the $6NH_2$ group of the adenine portion of the adenosine in the form of an amide.

The new adenosine phosphoric acid compound has the advantage of a much higher degree of solubility than adenylic acid, and has the further advantage that the $6NH_2$ group appears to be blocked by the amide formation against the deamination action by adenosine deaminase, so that the release of the phosphoric acid and adenosine occurs slowly and gradually with a resulting prolonged action.

The invention includes not only the new adenosido-6-phosphoric acid, but also salts, including metal salts such as the calcium, sodium and ferrous salts, salts with amines, including procaine, and salts and compounds with the amines of the vitamin B complex.

The production of the new adenosine-phosphoric acid compound can be carried out at room temperature by reacting adenosine in an excess of 90% orthophosphoric acid. Under such conditions, the basicity of the 6-amino group of the adenosine appears to be increased, and reaction of the phosphoric acid with the ribose portion of the adenosine appears to be prevented or retarded.

The production of the new adenosido-6-phosphoric acid is illustrated by the following example:

*Example 1*

3 g. adenosine are dissolved in 35 ml. of 85–90% orthophosphoric acid with stirring for two hours at 25° C. The solution is slowly added to 135 ml. of cold 95% ethanol and placed in refrigerator over night. Crystallization which starts in about one hour is completed over night.

The crystals are white, long needles, having the following properties:

Melting point 188–189 with decomposition.
Rotation in 10% HCl ($\alpha$) 25°—26.

| Analysis theory | Theory, Percent | Found, Percent |
|---|---|---|
| C | 34.60 | 32.69 |
| H | 4.04 | 4.64 |
| P | 8.94 | 8.98 |
| N | 20.15 | 19.59 |
| O (by difference) | 32.30 | 34.10 |
| N/P | 2.26 | 2.19 |

When the adenosido-6-phosphoric acid was hydrolyzed in 1-N hydrochloric acid for 15 minutes at 100° C., all of the phosphoric acid proved to be labile. An alkaline copper sulfate solution gave a clear solution with the new compound, showing that the cis-hydroxyls of the ribose portion of the product were free.

The X-ray spectrogram tests showed a specific spectrum different from that of adenosine, yeast adenylic acid or muscle adenylic acid.

The adenosido-6-phosphoric acid is highly water soluble. A 10% solution showed a pH of 2.2, as compared with 2.7 for yeast or muscle adenylic acid.

The new compound may be considered to have the following formula:

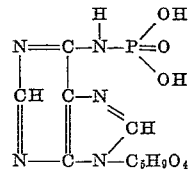

The new compound has acid properties and forms valuable salts, as illustrated by the following examples:

*Example 2*

*Calcium salt.*—1g. of the adenosido-6-phosphoric acid was dissolved in 10 cc. of water and 0.144 g. (½ mol) calcium carbonate was added to the solution. Evolution of carbon dioxide was observed, and a thick white mass of crystals formed. The crystals were fine needles. On standing over night, the crystals were filtered with suction and washed with water.

*Example 3*

*Sodium salt.*—1 g. of the adenosido-6-phosphoric acid was dissolved in 10 cc. of water and 0.242 g. (1 mol) sodium bicarbonate was added. Evolution of carbon dioxide occurred, and a clear solution was first obtained, followed by a mass of fine crystals after a short time. On standing over night, the crystals were filtered with suction, and washed with water.

*Example 4*

*Procaine salt.*—2 g. of the adenosido-6-phosphoric acid were dissolved in 20 cc. of water and 1.36 g. (1 mol) of procaine base was added to the solution. The procaine dissolved completely. On standing, the solution became turbid, and, after about an hour, a precipitate formed of long, hairlike needles, which were removed by filtration, after standing over night.

*Example 5*

*Nicotinamide salt.*—A solution of 1 g. of the adenosido-6-phosphoric acid was poured into a solution of 0.713 g. (2 mols) nictotinamide in 3 cc. of water. The crystals of the nicotinamide salt formed slowly, and after standing were filtered with suction, washed with a little water and dried.

Example 6

*Ferrous salt.*—2 g. of the adenosido-6-phosphoric acid was dissolved in 25 cc. of water and 0.57 g. (½ mol) powdered iron chloride ($FeCl_2.4H_2O$) was stirred in and dissolved. To this solution was added .08 g. silver carbonate, with stirring. The silver chloride which formed was filtered by suction and the filtrate was evaporated in vacuo to about 7 cc. On adding 3 volumes of acetone, a heavy precipitate of the ferrous salt formed, and, after standing in the ice box, the precipitate was filtered and washed with water.

In a similar manner, other amines of the vitamin complex may be reacted with the adenosido-6-phosphoric acid to produce e. g. the thiamine, riboflavin, choline, pyridoxin, etc. salts.

The new adenosido-6-phosphoric acid and its salts are useful in adenylic nucleotide therapy, having the advantage of prolonged action, with slower liberation of adenosine over a longer period of time.

The new preparations can be administered either orally or by injection. The prolonged action of the new compounds appears to be due, as above indicated, to the blocking of the free amido group, since it is known that the action of deamination enzymes such as adenosine deaminase causes a breakdown of adenosine and adenylic acid. The blocking of the 6-amino group of the adenosine through amidification with phosphoric acid appears to retard the action of such deamination enzymes and to explain the prolonged action of the compound.

Under milder conditions, on reaction the phosphoric acid combines with the 6-hydrogen of the adenosine to form an addition product, i. e., a salt of adenosine with phosphoric acid, where the phosphoric acid is combined with the amine group of the 6-nitrogen. And such phosphate salts are also capable of forming salts by further reaction thereof.

So far as I am aware, N-phospho adenosine compounds, where the phosphoric acid is combined entirely with the 6-nitrogen or amide group of adenosine, are new compounds.

Adenosine mono-phosphoric acid (adenylic acid), adenosine di-phosphoric acid, and adenosine tri-phosphoric acid which, like adenosine, have the free amino group in 6 position, can similarly be treated to form the phosphoric acid salts and amides through reaction of phosphoric acid with the 6-amino group. Thus, N-phospho compounds, including N-phosphoric acid salts, and N-phosphoric acid amides, can be produced by reacting adenylic acid or the adenosine di or tri phosphoric acid with phosphoric acid in a manner similar to that above described for the reaction of adenosine with phosphoric acid to form the N-phospho compounds.

The blocking of the 6-amino group of adenylic acid or of the adenosine mono or di phosphoric acids, by converting the 6-amino group into an amide with phosphoric acid, has a similar blocking effect to that above described in connection with the adenosido-6-phosphoric acid, with resulting prolonged action. The phosphoric acid will be combined in such compounds both with the ribose portion and with the 6-N-nitrogen of the adenine portion of the molecule.

The new adenosine-6-phosphoric acids containing phosphoric acid combined with the $6NH_2$ group of the adenine nucleus and which may or may not contain one or more phosphoric acid groups on the ribose nucleus, have the following general formula:

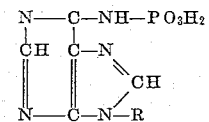

in which R is a group which consists of the unphosphorylated ribose group as well as mono-, di-, and tri-phosphorylated ribose groups such as are found in adenine mono, di-, and tri-phosphoric acids.

I claim:

1. Mono-adenosido-6-phosphoric acid having the following formula:

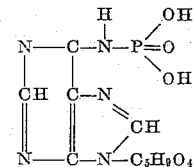

2. The procine salt of the mono-adenosido-6-phosphoric acid of claim 1.

3. The calcium salt of the mono-adenosido-6-phosphoric acid of claim 1.

4. The sodium salt of the mono-adenosido-6-phosphoric acid of claim 1.

5. The ferrous salt of the mono-adenosido-6-phosphoric acid of claim 1.

References Cited in the file of this patent

UNITED STATES PATENTS

| Number | Name | Date |
|---|---|---|
| 2,215,233 | Ruskin | Sept. 17, 1940 |
| 2,417,841 | Ruskin | Mar. 25, 1945 |
| 2,482,069 | Ruskin | Sept. 13, 1949 |